(12) United States Patent
Strohman

(10) Patent No.: US 7,533,597 B1
(45) Date of Patent: May 19, 2009

(54) ADAPTER MECHANISM FOR EXPLOSIVE ORDNANCE DISRUPTER APPARATUS

(75) Inventor: Scott A. Strohman, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/973,992

(22) Filed: Sep. 27, 2007

(51) Int. Cl.
| | |
|---|---|
| F42B 33/00 | (2006.01) |
| F41F 5/00 | (2006.01) |
| F41F 1/10 | (2006.01) |
| F41A 19/05 | (2006.01) |
| F16C 11/06 | (2006.01) |
| F41C 23/00 | (2006.01) |

(52) U.S. Cl. .................. 86/50; 89/1.41; 89/37.22; 89/41.16; 89/126; 89/127; 89/37.04; 42/72; 42/125; 403/150; 403/151

(58) Field of Classification Search ............... 86/50; 89/1.41, 37.04, 1.13, 37.22, 41.16, 126, 127; 42/72, 124, 125; 403/150–157, 318
See application file for complete search history.

(56) References Cited

U.S. PATENT DOCUMENTS

| | | | | | |
|---|---|---|---|---|---|
| 1,049,438 | A | * | 1/1913 | Augustine ............... 285/274 |
| 1,132,348 | A | * | 3/1915 | Hunter .................. 403/156 |
| 1,555,603 | A | * | 9/1925 | Overing, Jr. ............ 403/156 |
| 2,300,658 | A | * | 11/1942 | Dunn .................... 464/129 |
| 2,641,057 | A | * | 6/1953 | Moore .................... 42/127 |
| 2,743,526 | A | * | 5/1956 | Ivy ....................... 42/126 |
| 2,825,138 | A | * | 3/1958 | Ivy ....................... 42/124 |
| 3,226,868 | A | * | 1/1966 | Mahoney ................. 42/128 |
| 3,462,973 | A | * | 8/1969 | Venable ................. 464/119 |
| 4,411,132 | A | * | 10/1983 | Crook, Jr. ................. 59/85 |
| 4,889,458 | A | * | 12/1989 | Taylor .................... 411/383 |
| 5,531,039 | A | * | 7/1996 | Gore ..................... 42/124 |
| 6,074,126 | A | * | 6/2000 | Hunter et al. ............ 403/404 |
| 6,408,731 | B1 | | 6/2002 | Elsener |
| 6,490,957 | B1 | | 12/2002 | Alexander et al. |
| 6,591,538 | B2 | * | 7/2003 | Holler .................... 42/125 |
| 6,644,166 | B2 | | 11/2003 | Alexander et al. |
| 7,341,545 | B2 | * | 3/2008 | Cao ....................... 482/93 |
| 2002/0096079 | A1 | | 7/2002 | Alford |
| 2003/0041722 | A1 | | 3/2003 | Alexander et al. |
| 2005/0081706 | A1 | | 4/2005 | Alford |

* cited by examiner

Primary Examiner—Stephen M Johnson
Assistant Examiner—Daniel J Troy
(74) Attorney, Agent, or Firm—Fredric J. Zimmerman

(57) ABSTRACT

An adapter mechanism for use with an explosive ordnance disrupter arrangement. The adapter includes a yoke and a mount rotatable relative to the yoke to assume a desired angular orientation, which is locked in the desired position. The yoke may be mounted on an explosive ordnance primary disrupter. The mount carries a supplemental disrupter.

8 Claims, 6 Drawing Sheets

US 7,533,597 B1

ADAPTER MECHANISM FOR EXPLOSIVE ORDNANCE DISRUPTER APPARATUS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The invention in general relates to explosive ordnance disposal, and more particularly to a novel mechanism for use with a primary disrupter and a supplemental disrupter arrangement.

2. Description of the Prior Art

A disrupter is a primary tool used by explosive ordnance disposal technicians. The disrupter is basically a gun barrel positioned on a mount and is designed to fire various projectiles at a bomb with the intention of preventing it from exploding. Typically, the barrel is directed at a particular component of the bomb to disrupt that component. Various projectiles may be accommodated by the disrupter including lead and steel shot, hollow point slugs, bean bags, solid steel slugs and water and other liquids, to name a few.

In one possible scenario a suspect target may be located in a vehicle behind closed windows. An explosive ordnance technician has to either remotely open the vehicle door or break a window. The most common tactic used in this situation is to fire a disrupter round at the window to break it and shoot the target with another disrupter. Often the disrupter is carried on a remotely controlled robot that can carry only one disrupter at a time. Thus, the stated scenario would require two such robots. Since such robots are extremely expensive, the use of two different robots is not an option.

SUMMARY OF THE INVENTION

It is a primary object of the present invention to provide disrupter apparatus that allows one robot to accomplish both tasks of window breaking and bomb disruption.

An adapter mechanism for explosive ordnance disrupter apparatus includes an adapter having a yoke and a mount rotatable relative to the yoke. The yoke includes an aperture for mounting on a primary disrupter barrel with the mount including an aperture for mounting a supplemental disrupter barrel. The adapter includes a locking structure for locking and unlocking the yoke and the mount in and from a desired angular orientation.

The invention will be better understood, and further objects, features, and advantages thereof will become more apparent from the following description of the exemplary embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE EXEMPLARY EMBODIMENTS OF THE INVENTION

Figure 1:
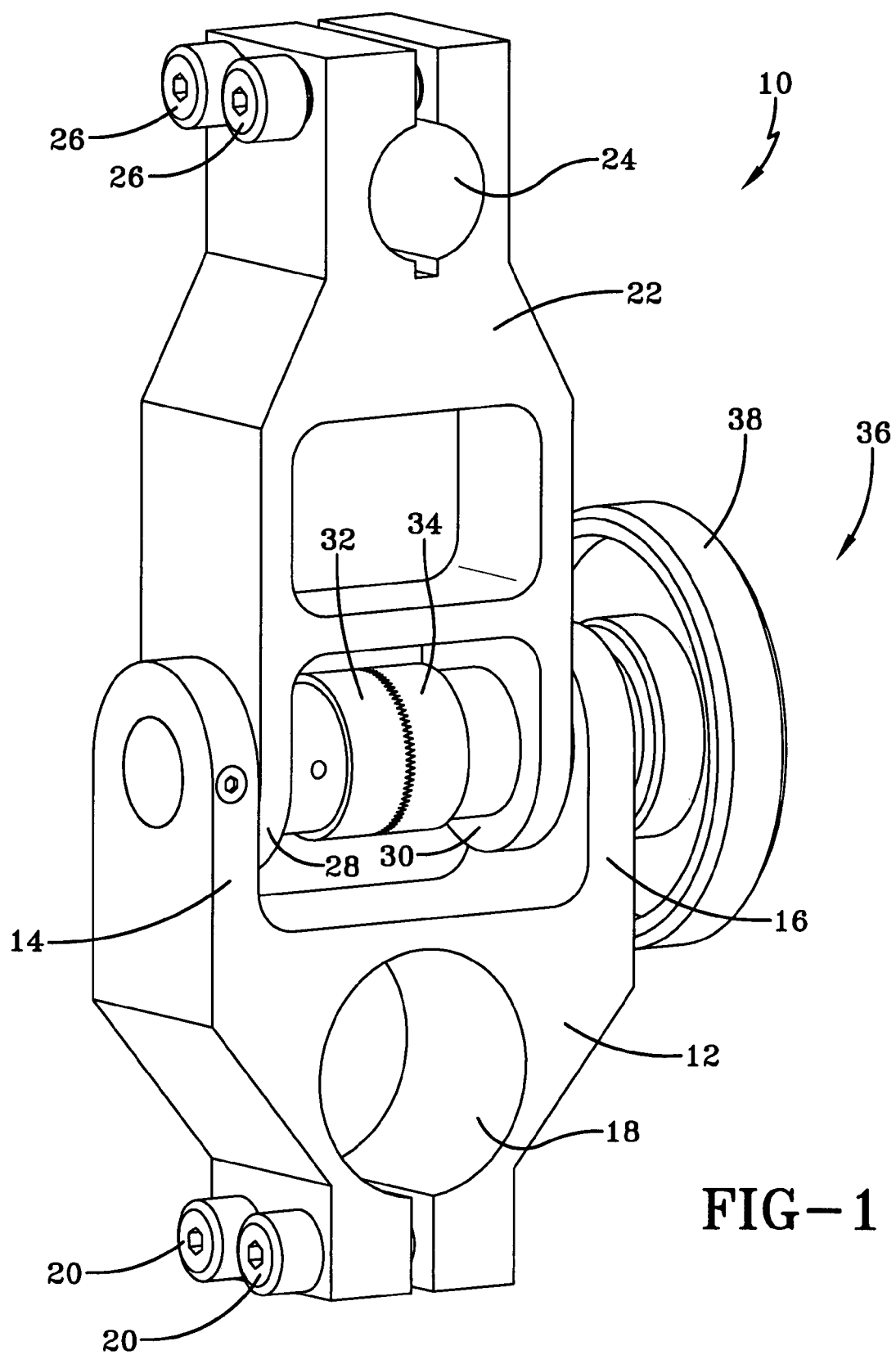
FIG. 1 is a view of an adapter mechanism in accordance with one exemplary embodiment of the present invention.

Referring now to FIG. 1 there is illustrated an exemplary embodiment of an adapter mechanism 10 in accordance with the present invention. The adapter 10 includes a generally "Y" shaped yoke 12 having first and second arms 14 and 16. Adapter 10 has an aperture 18 into which is placed the barrel of a primary disrupter with the barrel of the primary disrupter being held in position relative to the yoke by means of screws 20. A mount 22 is rotatable relative to the yoke 12. The mount 22 includes an aperture 24 into which is placed the barrel of a supplemental disrupter, with the barrel of the supplemental disrupter being held in position relative to the mount by means of screws 26.

Extending between depending arms 28 and 30 of mount 22 are two couplers 32 and 34. These two couplers are disengageable with one another to adjust the angle of the mount 22 relative to that of the yoke 12. Thereafter, the two couplers 32 and 34 are engageable with one another to lock the mount 22 in the selected angular position. The engagement and disengagement of the couplers 32 and 34 is controlled by a lock 36 having a hand turnable knob 38. Operation of the adapter 10 may best be understood with additional reference to FIGS. 2A, 2B, 3, 4 and 5.

Figure 2A:
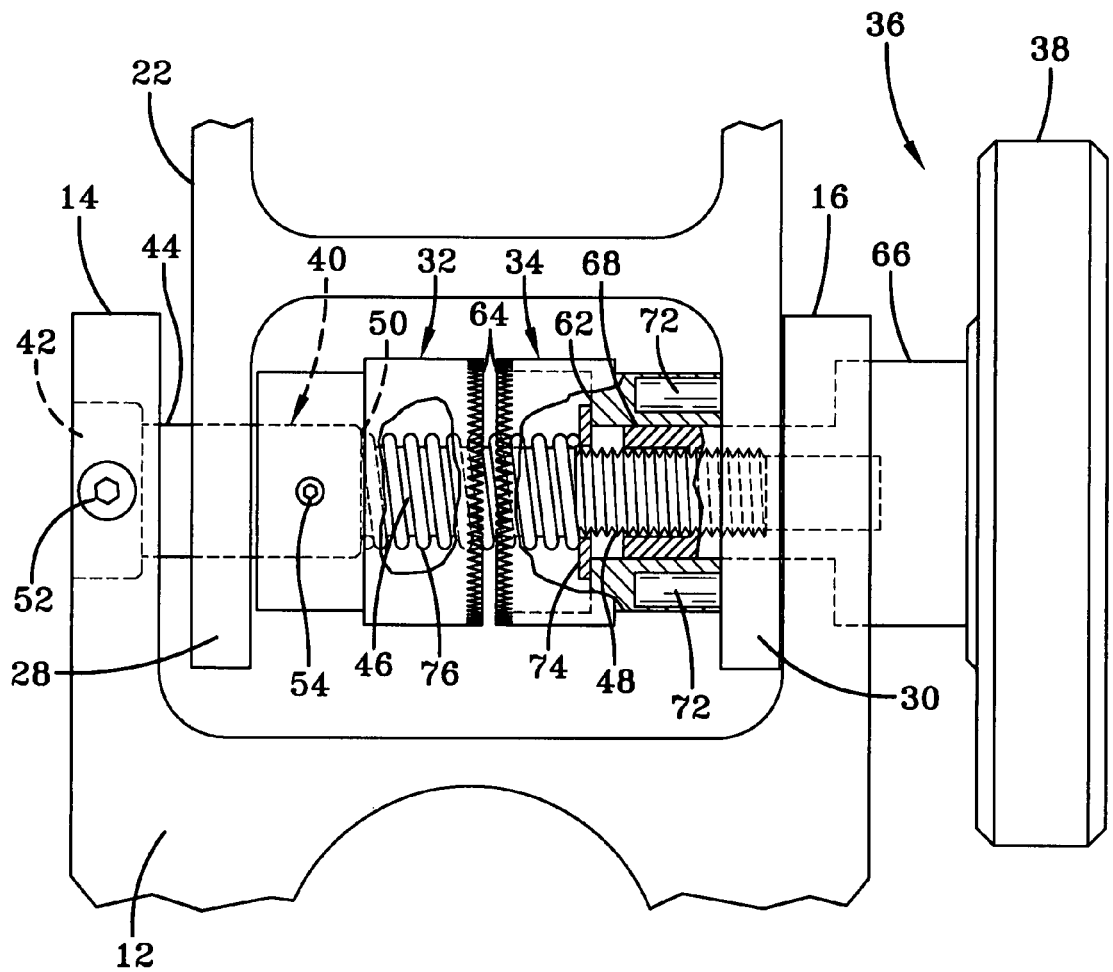
FIG. 2A is a partial sectional view of the adapter with a coupler arrangement disengaged.
Figure 3:
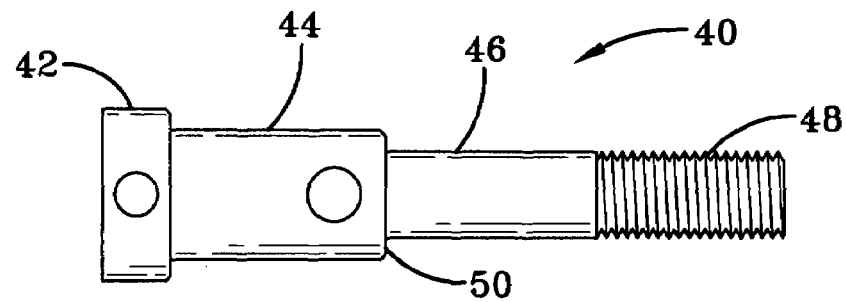
FIG. 3 is a view of a shaft used in the adapter.
Figure 4:
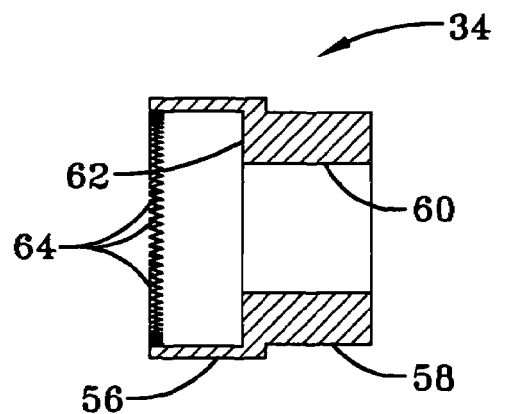
FIG. 4 is a view of a coupler used in the adapter

FIG. 2A illustrates the couplers 32 and 34 in a disengaged position whereby the mount 22 may be angularly moved relative to the yoke 12. The arrangement includes a shaft 40 that passes through the left coupler 32 and into the right coupler 34. A view of the shaft 40 is illustrated in FIG. 3. With reference to FIG. 3, shaft 40 includes a head portion 42, a mid portion 44 of lesser diameter and an end portion 46 having the smallest diameter. End portion 46 includes a set of external threads 48 and the area where the mid portion 44 meets the end portion 46 defines a ledge 50.

Figure 5:
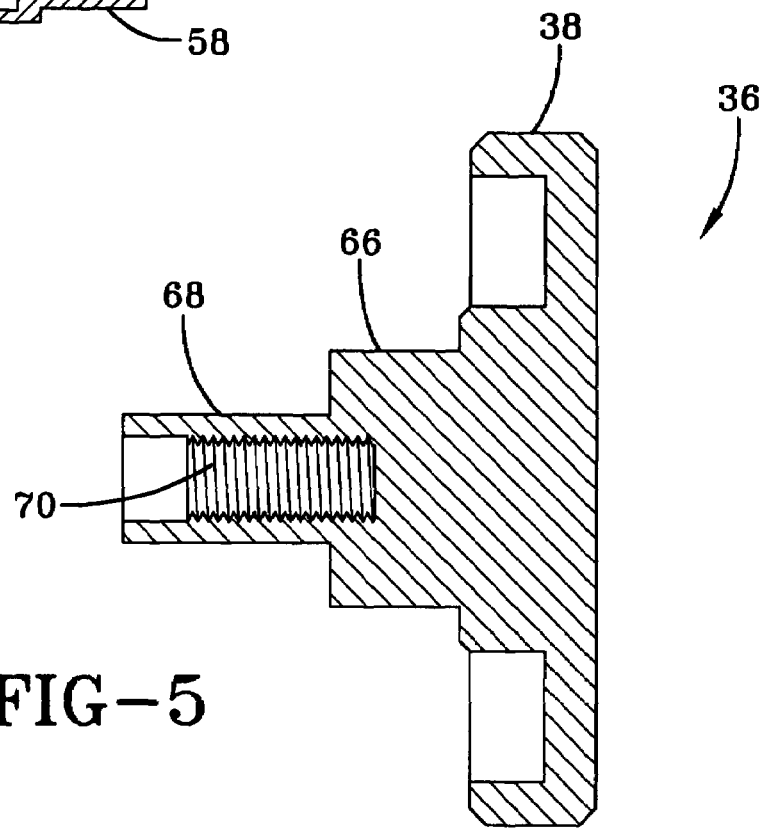
FIG. 5 is a view of a lock used in the adapter.

As seen in FIG. 2A, head 42 of shaft 40 fits into arm 14 of yoke 12 and is secured in place by means of a set screw 52. Coupler 32 is likewise affixed to shaft 40 by means of a set screw 54. Shaft 40 extends through coupler 32 and into coupler 34. Lock 36 extends into coupler 34, a cross-sectional view of which may be seen in FIG. 4. Coupler 34 includes a thin walled front portion 56 and a thick walled rear portion 58 having an aperture 60 extending there through and defining a ledge 62. Teeth 64 at the end of front portion 56 are engageable with a similar set of teeth on coupler 32, which is of identical construction. In an exemplary embodiment, the teeth 64 are of a generally triangular shape to facilitate mutual engagement. Components of lock 36 extend into coupler 34 and a view of the lock 36 is illustrated in FIG. 5. In addition to knob 38, lock 36 includes a mid portion 66 and an end portion 68 of lesser diameter having internal threads 70 that engage threads 48 of shaft 40 (FIG. 3).

Referring once again to FIG. 2A, coupler 34 is secured to arm 30 of mount 22 by means of pins 72 and is moveable along with mount 22. A washer 74 rests on ledge 62 of coupler 34 and a spring 76 extends from ledge 50 of shaft 40 to the washer 74 and is seen, in FIG. 2A, in a noncompressed condition. When mount 22 is rotated by hand to a desired angular position relative to yoke 12, knob 38 is turned, screwing internal threads 70 of the lock's end portion 68 onto external threads of shaft 40 thereby drawing the two components together and compressing spring 76.

Figure 2B:
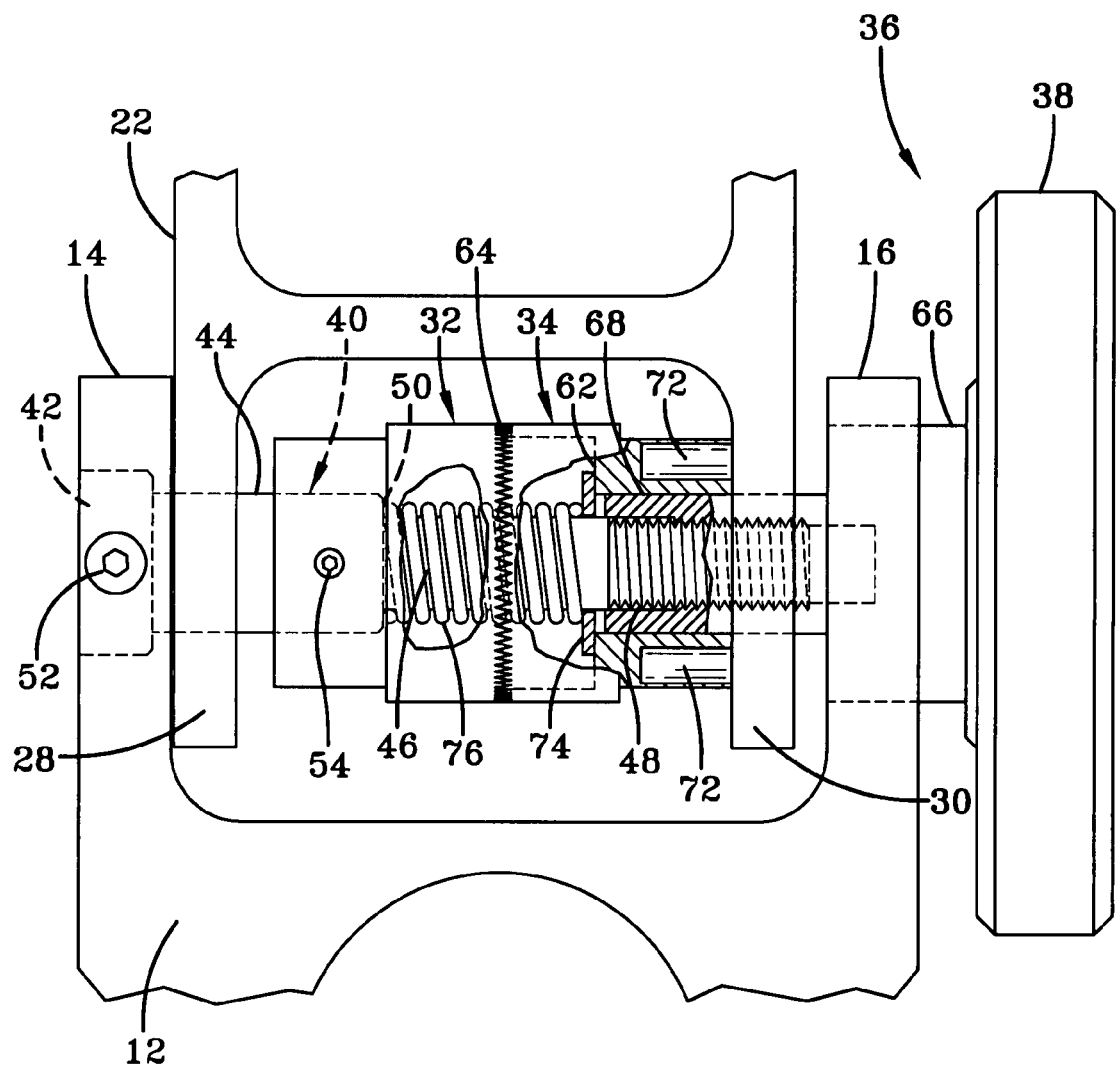
FIG. 2B is a partial sectional view of the adapter with the coupler arrangement engaged.

During such action, mount 22 moves to the left in FIG. 2A until it assumes the orientation depicted in FIG. 2B whereby arm 28 of mount 22 touches arm 14 of yoke 12. In this position, the teeth 64 of couplers 32 and 34 engage to firmly lock the mount 22 in the desired position. As seen in FIG. 2B, spring 76 is in a fully compressed condition and will assist in forcing the two couplers 32 and 34 apart when knob 38 is unscrewed so that a new desired angular orientation of yoke 12 and mount 22 may be made.

Figure 6:
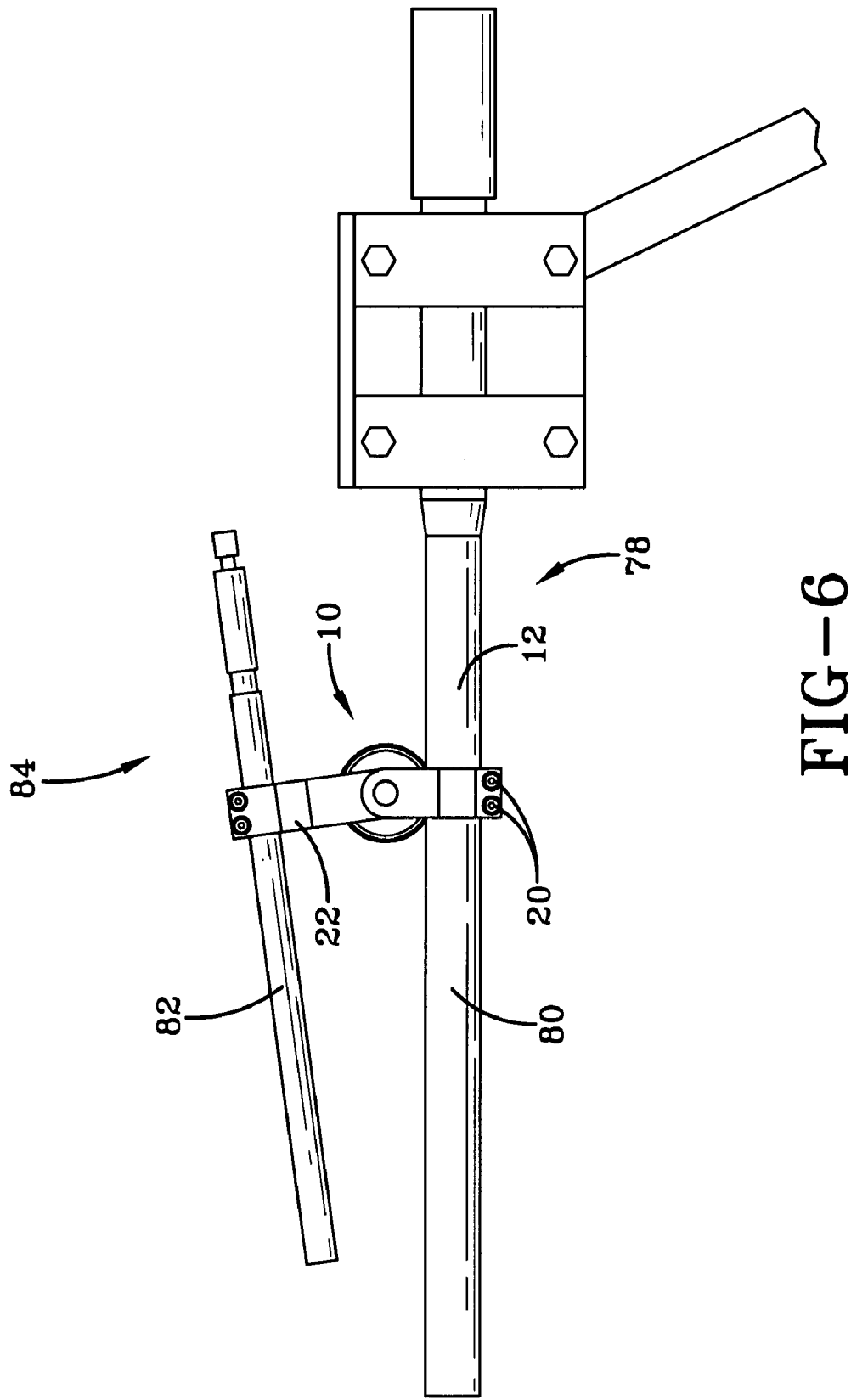
FIG. 6 is a view of the adapter mounted on a primary disrupter.
Figure 7:
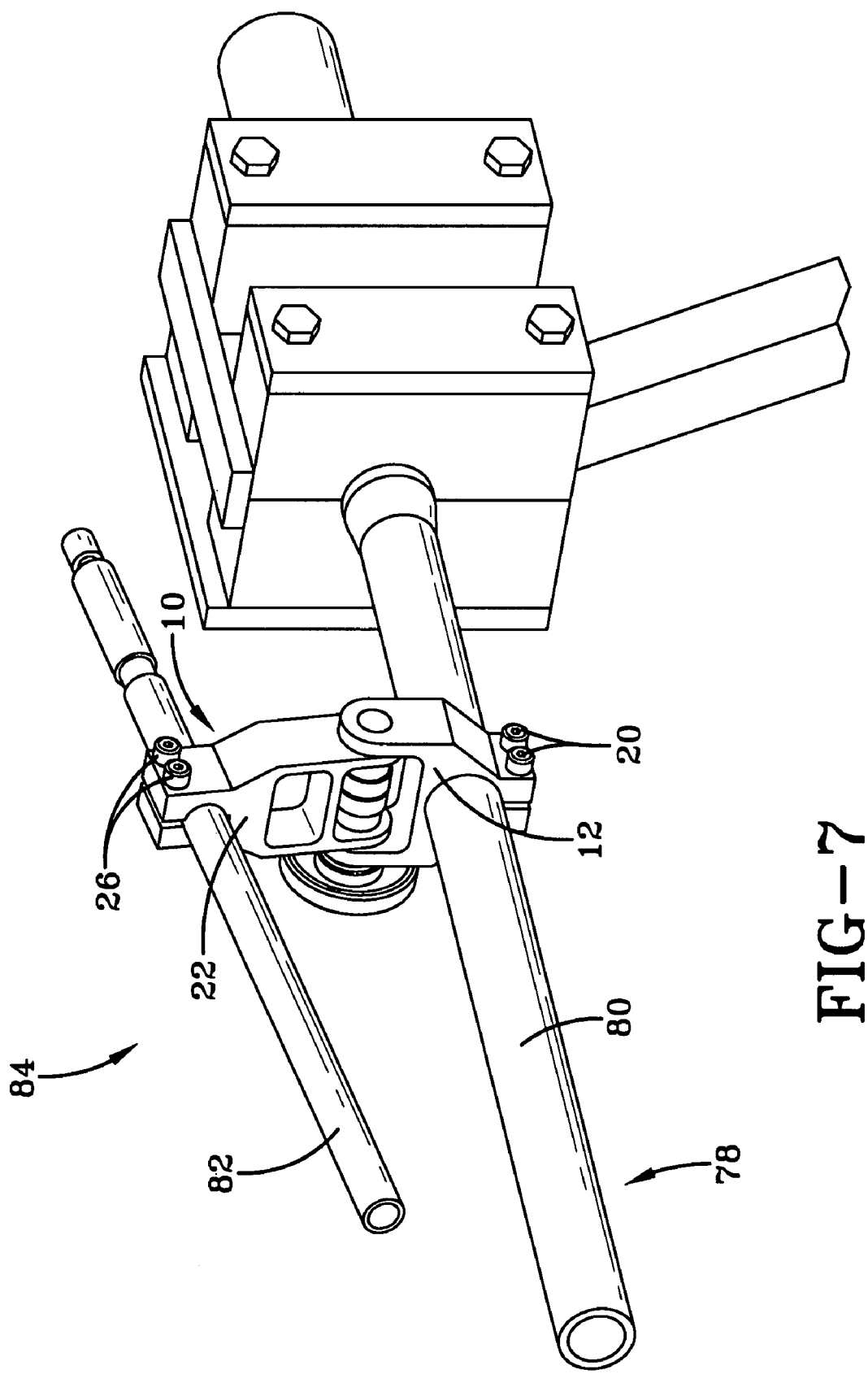
FIG. 7 is another view of the adapter mounted on a primary disrupter.

FIGS. 6 and 7 are two views of the adapter 10 in use. A primary disrupter 78 includes a barrel 80 onto which is secured the yoke 12 of adapter 10 by screws 20. Mount 22 is at a desired angular orientation relative to yoke 12 and carries a barrel 82 of a supplemental disrupter 84 and is secured to barrel 82 by screws 26.

It will be understood that many additional changes in the details, materials, steps and arrangement of parts, which have been herein described and illustrated in order to explain the nature of the invention, may be made by those skilled in the art within the principle and scope of the invention as expressed in the appended claims.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An adapter mechanism for explosive ordnance disrupter apparatus, comprising:
   an adapter comprising a yoke and a mount being rotatable relative to said yoke,
   wherein said mount contacts at least one weapon barrel,
   wherein said yoke includes an aperture for mounting on a primary disrupter barrel, and
   wherein said mount includes an aperture for mounting a supplemental disrupter barrel; and
   a locking structure for locking and unlocking said yoke and said mount in and from a desired angular orientation; and
   a first coupler and a second coupler where each of said first coupler and said second coupler comprises a walled front portion,
   wherein each of said first coupler and said second coupler comprises a plurality of teeth positioned around said thin walled front portion, and
   wherein said plurality of teeth of said first coupler are engageable with said plurality of teeth of said second coupler.

2. The mechanism according to claim 1, wherein said yoke includes a first spaced apart yoke arm and a second spaced apart yoke arm,
   wherein said mount includes a first spaced apart mount arm and a second spaced apart mount arm, and
   wherein said first spaced apart mount arm and said second spaced apart mount arm are positioned between said first spaced apart yoke arm and said second spaced apart yoke arm.

3. The mechanism according to claim 2,
   wherein said walled front portion of said each of said first coupler and said second coupler faces one other,
   wherein said first coupler and said second coupler are positioned between said first spaced apart mount arm and said second spaced apart mount arm, and
   wherein said second coupler is affixed to said second spaced apart mount arm.

4. The mechanism according to claim 1,
   wherein said plurality of teeth are generally triangular shaped teeth.

5. The mechanism according to claim 2, further comprising a shaft,
   wherein said shaft passes through said first spaced apart yoke arm and said first spaced apart mount arm as well as through said first coupler,
   wherein said shaft includes first threads at an end thereof,
   wherein said first coupler is secured to said shaft, and
   wherein said shaft extends into said second coupler.

6. The mechanism according to claim 2, further comprising a shaft,
   wherein said shaft passes through said first spaced apart yoke arm and said first spaced apart mount arm as well as through said first coupler,
   wherein said locking structure includes a lock passing through said second spaced apart yoke arm and said second spaced apart mount arm and into said second coupler, and
   wherein said lock comprises second threads at an end thereof, which engage with first threads of said shaft.

7. The mechanism according to claim 2, further comprising a shaft,
   wherein said shaft passes through said first spaced apart yoke arm and said first spaced apart mount arm as well as through said first coupler,
   wherein said locking structure includes a lock passing through said second spaced apart yoke arm and said second spaced apart mount arm and into said second coupler,
   wherein said lock comprises second threads at an end thereof, which engage with first threads of said shaft, and
   wherein said first threads are external threads and said second threads are internal threads.

8. The mechanism according to claim 2, further comprising a shaft,
   wherein said shaft passes through said first spaced apart yoke arm and said first spaced apart mount arm as well as through said first coupler,
   wherein said second coupler includes said thin walled front portion and said rear portion, said rear portion is relatively thick walled and includes an aperture there through to define a ledge where said thin walled front portion and said rear portion meet, and
   wherein a washer is positioned at said ledge and a spring extends from said shaft to said washer.

* * * * *